(12) United States Patent
Reid

(10) Patent No.: US 7,914,895 B2
(45) Date of Patent: Mar. 29, 2011

(54) MOISTURE CURABLE HOT MELT ADHESIVE COMPOSITION

(75) Inventor: Kevin J. Reid, White Bear Lake, MN (US)

(73) Assignee: H.B. Fuller Company, St. Paul, MN (US)

( * ) Notice: Subject to any disclaimer, the term of this patent is extended or adjusted under 35 U.S.C. 154(b) by 978 days.

(21) Appl. No.: 11/805,777

(22) Filed: May 24, 2007

(65) Prior Publication Data
US 2008/0292902 A1    Nov. 27, 2008

(51) Int. Cl.
B32B 27/40 (2006.01)
C08G 18/61 (2006.01)

(52) U.S. Cl. ............... 428/423.1; 428/424.6; 428/424.8; 526/935; 156/332

(58) Field of Classification Search .................. 428/500, 428/424.6, 424.8, 423.1; 526/935; 156/332; 525/101, 173, 451
See application file for complete search history.

(56) References Cited

U.S. PATENT DOCUMENTS

| 4,618,651 | A | 10/1986 | Gilch et al. |
| 4,808,255 | A | 2/1989 | Marhevka et al. |
| 5,472,785 | A | 12/1995 | Stobble, IV |
| 5,536,805 | A | 7/1996 | Kangas |
| 6,355,317 | B1 * | 3/2002 | Reid et al. ............... 428/34 |
| 6,387,449 | B1 | 5/2002 | Reid et al. |
| 6,803,412 | B2 | 10/2004 | Nguyen-Misra et al. |
| 7,112,631 | B2 * | 9/2006 | Zhang et al. ............... 525/127 |
| 7,267,878 | B2 * | 9/2007 | Primke et al. ............... 428/423.1 |
| 2004/0180155 | A1 | 9/2004 | Nguyen-Misra |
| 2005/0143549 | A1 | 6/2005 | Schijndel |
| 2006/0210808 | A1 | 9/2006 | Hung et al. |

FOREIGN PATENT DOCUMENTS
GB        1 290 489      9/1972
JP        2006037037     2/2006

* cited by examiner

Primary Examiner — Thao T. Tran

(57) ABSTRACT

A moisture curable hot melt adhesive composition includes a polyurethane prepolymer, optionally a tackifying resin, and optionally a thermoplastic polymer. The polyurethane prepolymer includes a reaction product of an amorphous polyester polyol, a polyisocyanate, and a crystalline monofunctional alcohol that has a melting point of no less than about 80° C.

19 Claims, No Drawings

MOISTURE CURABLE HOT MELT ADHESIVE COMPOSITION

The invention relates to a moisture curable hot melt adhesive composition including a moisture curable polyurethane prepolymer. In particular, the moisture curable polyurethane prepolymer includes a reaction product of an amorphous polyester polyol, a polyisocyanate, and a crystalline monofunctional alcohol.

BACKGROUND OF THE INVENTION

Both hot melt adhesives and moisture curable hot melt polyurethane adhesives are well known generic adhesive classes. A hot melt adhesive can be conveniently applied by extruding the adhesive at an elevated temperature directly onto a work piece to form a structural bond with another work piece as the temperature of the adhesive cools. While hot melt adhesives have many adhesive preparation and work piece production benefits, they have an effective temperature use range that is lower than their application temperature. In other words, the adhesives can lose bond strength as the temperature of the work piece and the bond line increase.

In sharp contrast, moisture curable hot melt polyurethane adhesives have little green strength in their open state, limited peel and shear strength after set and require curing before these properties improve. After application of an adhesive, the joined work pieces may require external mechanical support until the adhesive cures to a strong resilient, crosslinked bond line. A cured polyurethane adhesive bond has high tensile strength, which can be maintained above its application temperature e.g., from about 100° C. to about 130° C. Such adhesives have value where initial green strength is not important since substantial bond formation requires a period of curing time, which can range from hours to a number of days.

Clearly a moisture curable hot melt adhesive that displays the high initial peel and shear strength of a hot melt and that builds in bond strength over time is desirable. Early attempts to formulate such an adhesive have been made but none have been entirely successful. Some early formulas set as a hot melt adhesive, but produced only modest increases in heat resistance when fully cured. Other early adhesives may have good green strength, but short open times, low heat resistance as cured, (e.g., low peel adhesion failure temperature (PAFT)), and limited adhesion to plastics. Accordingly, a substantial need exists in finding better moisture curable hot melt adhesive formulations.

SUMMARY OF THE INVENTION

In one aspect, the invention features a moisture curable hot melt adhesive composition that includes a moisture curable polyurethane prepolymer. The polyurethane prepolymer includes a reaction product of an amorphous polyester polyol, a polyisocyanate, and a crystalline monofunctional alcohol.

In one embodiment the adhesive composition further includes a tackifying resin.

In other embodiments, the adhesive composition further includes a thermoplastic polymer.

In one embodiment, the adhesive composition is free of a crystalline or a semi crystalline polyester polyol. That is, the composition does not include a crystalline or a semi crystalline polyester polyol as a reactant. In other words, the composition does not include a reaction product that includes a crystalline or a semi crystalline polyester polyol as a reactant.

In one embodiment, the amorphous polyester polyol includes a reaction product of a polyol and a dimerized fatty acid.

In one embodiment, the amorphous polyester polyol has a hydroxyl number of from about 30 to about 210, or from about 30 to about 80.

In another embodiment, the amorphous polyester polyol has a glass transition temperature of from about 0° C. to about −50° C., or from about −20° C. to about −50° C.

In some embodiments, the crystalline monofunctional alcohol has a melting point of from about 80° C. to about 100° C.

In one embodiment, the crystalline monofunctional alcohol has a weight average molecular weight of from about 400 g/mol to about 1,000 g/mol, in some embodiments from about 450 g/mol to about 500 g/mol.

In one embodiment, the polyurethane prepolymer has a weight average molecular weight of at least about 20,000 g/mole.

In one embodiment, the adhesive composition exhibits a melt viscosity of from about 5,000 centipoises (cps) to about 150,000 cps, in other embodiments from about 5,000 cps to about 50,000 cps at 250° F. (121° C.).

The adhesive composition exhibits very good adhesion to wood and plastic substrates. The adhesive composition also exhibits fast setting, high green strength, good flexibility at low temperatures, and high heat resistance at elevated temperatures.

The adhesive composition can be applied by roll coating, extruding, or spraying.

In another aspect, the invention features an article that includes a first substrate, a second substrate, and any one of the aforesaid moisture curable hot melt adhesive compositions sandwiched between the first and the second substrates.

In other aspects the invention features a moisture curable polyurethane prepolymer that includes a reaction product of an amorphous polyester polyol, polyisocyanate, and a crystalline monofunctional alcohol. In one embodiment, the monofunctional alcohol has from 20 to 100 carbon atoms. In one embodiment, the polyester polyol includes a reaction product of a polyol and a dimerized acid. In other embodiments, the crystalline monofunctional alcohol has a melting point of from about 80° C. to about 100° C.

In another aspect, the invention features an article that includes a first substrate, a second substrate, and any one of the aforesaid moisture curable polyurethane prepolymers sandwiched between the first and the second substrates.

In still other aspects, the invention features a method of bonding a first substrate to a second substrate. The method includes contacting a first substrate with any one of the aforesaid moisture curable polyurethane prepolymers, or any one of the aforesaid moisture curable hot melt adhesive compositions, and contacting the prepolymer or the adhesive composition with a second substrate.

In one embodiment, at least one of the first and the second substrates includes a material chosen from acrylonitrile-butadiene-styrene (ABS), fiber reinforced plastic (FRP), wood, wood composite panels, polyvinyl chloride (PVC), paper, impact modified polystyrene, polycarbonate, foamed polystyrene, metals, painted metals, or galvanized metals, or combinations thereof.

Other features and advantages will be apparent from the following description of the preferred embodiments and from the claims.

DETAILED DESCRIPTION

The moisture curable hot melt adhesive composition includes a moisture curable polyurethane prepolymer, and optionally a tackifying resin, and optionally a thermoplastic polymer.

Polyurethane Prepolymer

The moisture curable polyurethane prepolymer is referred to hereinafter as "polyurethane prepolymer" or "prepolymer".

The polyurethane prepolymer has a melt viscosity of from about 500 cps to about 70,000 cps, or from about 2,000 cps to about 40,000 cps, or from about 5,000 cps to about 25,000 cps at 250° F. (121° C.). The polyurethane prepolymer has a glass transition temperature of no greater than about 10° C.

The polyurethane prepolymer is prepared by reacting polyisocyanate, an amorphous polyester polyol, and a crystalline monofunctional alcohol to form the isocyanate terminated prepolymer that has at least two isocyanate functional groups capable of reacting with moisture or other reactive hydrogen containing compounds.

Useful methods of preparing isocyanate functional polyurethane prepolymers are disclosed in a number of references including, e.g., U.S. Pat. Nos. 6,355,317, 6,387,449, 5,965,662, 4,808,255, and 4,775,719, which are incorporated herein by reference.

Preferably the polyester polyol and the monofunctional alcohol are reacted with excess diisocyanate (i.e., the amount of isocyanate functional groups present in the reaction mixture is greater than the number of hydroxy equivalents present in the reaction mixture) in a first step to form the isocyanate functional polyurethane prepolymer. Preferably the ratio of isocyanate groups (NCO) to hydroxy groups (OH) in the reaction mixture is sufficient to obtain an isocyanate concentration in the final composition of from about 1% by weight to about 10% by weight as measured by ASTM D-2572-80. Preferably the ratio of the isocyanate groups to the hydroxy groups in the reaction mixture is from about 1.1:1 to about 4:1, or from about 2:1 to about 3:1. Preferred polyurethane prepolymers have an average functionality (i.e., average number of isocyanate functional groups) of at least about 1.8, or at least about 2, or no greater than about 3.

The polyurethane prepolymer is present in the adhesive composition in an amount of up to about 100% by weight, or from about 10% by weight to about 80% by weight, or from about 20% by weight to about 70% by weight, or from about 20% by weight to about 50% by weight, based on the total weight of the composition.

Polyisocyanate

The polyisocyanate can be any suitable isocyanate compounds that have at least two isocyanate groups including, e.g., aliphatic, cycloaliphatic, araliphatic, arylalkyl, alkylaryl, and aromatic isocyanates, and mixtures thereof. The isocyanate compounds can also contain other substituents that do not substantially adversely affect the viscosity of the prepolymer, the adhesive properties of the bond line, or the reactivity of the isocyanate groups during the formation of the prepolymer. The isocyanate compound can also include mixtures of aromatic and aliphatic isocyanates, as well as isocyanate compounds having both aliphatic and aromatic character.

Typical aromatic isocyanate compounds include diphenylmethane diisocyanate compounds (MDI) including its isomers, carbodiimide modified MDI, diphenylmethane-4,4'-diisocyanate, diphenylmethane-2,2'-diisocyanate, diphenylmethane-2,4'-diisocyanate, oligomeric phenyl methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including for example isophorone diisocyanate, hydrogenated aromatic diisocyanates, aliphatic polyisocyanates, cycloaliphatic polyisocyanates, and others. Other useful isocyanates are disclosed in, e.g., U.S. Pat. Nos. 6,803,412; 6,387,449; 6,355,317; 6,221,978; 4,820,368; 4,808,255; 4,775,719; and 4,352,85, which are incorporated herein by reference.

Particularly preferred diisocyanates are blends of 2,4'-methylene diphenyl diisocyanate and 4,4-methylene diphenyl diisocyanate.

Useful commercially available aromatic isocyanates include, e.g., aromatic isocyanates available under the trade designations MONDUR ML from Bayer (Pittsburgh, Pa.), ISONATE 50 OP and ISONATE 125M from Dow Chemical Company (Midland, Mich.), and LUPRANATE MI from BASF (Germany).

Polyester Polyol

Suitable polyester polyols useful in the preparation of the prepolymer are amorphous polyester polyols. Contrary to crystalline or semi crystalline polyester polyols that have a crystalline melting point, amorphous polyester polyols do not have crystallinity, therefore, do not have a crystalline melting point.

Preferably, useful amorphous polyester polyols have a functionality of from about 2 to about 3, or from about 2.1 to about 2.4.

Examples of amorphous polyester polyols include those that are reaction products of polyol/diol and ricinoleic acid, e.g., Polycin® GR-Polyols from Vertellus Performance Material INC. (Greensboro, N.C.).

Preferably, the amorphous polyester polyols are dimer acid based polyester polyols. By "dimer acid based polyester polyol" it refers to a reaction product of a monomeric polyol and a dimerized fatty acid. A dimerized fatty acid is an oligomerisation product of two unsaturated fatty acids and has two or more carboxylic functionalities. Preferably, the unsaturated fatty acids have at least 12 carbon atoms, or up to 24 carbon atoms. In one embodiment, the unsaturated fatty acid has 18 carbon atoms. Examples of commercially available dimerized fatty acid include PRIPOL 1017, 1013 and 1006 from Uniqema (Chicago, Ill.).

Examples of suitable monomeric polyols from which dimer acid based polyester polyols can be derived include ethylene glycols, propane diols (e.g., 1,2-propanediol and 1,3-propanediol), butane diols (e.g., 1,3-butanediol), 1,5-pentanediol, 1,6-hexanediol, 1,8-octanediol, 1,10-decanediol, neopentyl glycol, diethylene glycol, triethylene glycol, tetraethylene glycol, polyethylene glycols, polypropylene glycols (e.g., dipropylene glycol and tripropylene glycol) 1,4-cyclohexanedimethanol, 1,4-cyclohexanediol, dimer diols, bisphenol A, bisphenol F, hydrogenated bisphenol A, hydrogenated bisphenol F, glycerol, and combinations thereof.

Examples of useful commercially available dimer acid-based polyester polyols include those under PRIPLAST series of trade designations including, e.g., PRIPLAST 3187, 3190, 3196, and 3197 from UNIQEMA (New Castle, Del.)

The amorphous polyester polyols useful in the preparation of the polyurethane prepolymers of the invention are tailored in polarity to the polarity of the thermoplastic polymer, for example, ethylene vinyl acetate (EVA) copolymer used in the adhesive. The polarity of a polyester polyol can be estimated using the average equivalent weight of the monomeric polyol and the average equivalent weight of the polyacid. For ethylene vinyl acetate copolymers having 50% vinyl acetate or more, the sum of the average equivalent weight of the polyol and the polyacid is from about 150 to about 500. For an ethylene vinyl acetate having a vinyl acetate content of about 28% to 50%, the sum of the average equivalent weight of the polyol and the polyacid is from about 150 to about 600 or preferably 200 to 500. For an ethylene vinyl acetate having a vinyl acetate content of 28% or less the sum of the average equivalent weight of the polyol and the polyacid is from about 250 to about 300, and preferably from about 300 to about 1500.

The molecular weight of the amorphous polyester polyol is conversely proportional with the polarity of the resultant polyurethane prepolymer. That is, the polarity of the prepolymer increases as the molecular weight of the amorphous polyester polyol decreases. Therefore, one could adjust the molecular weight of the amorphous polyester polyol to obtain the prepolymer with a desirable polarity, which matches with the polarity of the thermoplastic polymer, e.g., an EVA copolymer to enhance the compatibility of the adhesive.

Monofunctional Alcohol

The monofunctional alcohol suitable for the preparation of the polyurethane prepolymer of the invention is crystalline and preferably an alkyl alcohol having from 20 to 100, or from 30 to 60 or from 40 to 50 carbon atoms. In one embodiment, the monofunctional alcohol has carbon atoms of no less than 35.

Useful monofunctional alcohols have a melting point of from about 70° C. to about 100° C., or from about 80° C. to about 100° C.

Examples of useful commercially available monofunctional alcohols include UNILIN series of trade designation, e.g., UNILIN 350, 425, 550 and 700 from Baker Petrolite (Sugar Land, Tex.).

Monofunctional alcohol is preferably present in the reaction mixture in an amount of from about 5% to about 40%, or from about 10% to about 25% of polyol equivalents in the prepolymer.

Thermoplastic Polymer

The adhesive composition of the invention may include a thermoplastic polymer. Suitable thermoplastic polymers are compatible and cooperate with the other adhesive components to provide the initial green strength and the final cured strength. Preferably, the thermoplastic polymer is matched in polarity with the polyurethane prepolymer and with the tackifier.

The preferred thermoplastic polymer component includes ethylene vinyl monomer polymers such as an ethylene vinyl acetate (EVA) copolymers, or polymers containing carboxylic acid groups.

In one embodiment, the preferred polyurethane prepolymers are formulated to have a polarity compatible with ethylene vinyl acetate (EVA) copolymers having from about 10% to about 60% vinyl acetate and a melt index of from about 0.2 g/min to about 1000 g/min. The most preferred EVA copolymers includes those that have from about 18% to 50% vinyl acetate and a melt index of about 0.2 g/min to 500 g/min.

Examples of other useful thermoplastic polymers include polyurethanes, polystyrene, polyetheramide block copolymers, polyesters, butadiene-styrene elastomers including, e.g., A-B, A-B-A, A-(B-A)n-B, (A-B)n-Y, and radial block copolymers and grafted versions thereof where the A block(s) is a polyvinyl aromatic block (e.g., styrene), and the B block is a rubbery midblock (e.g., isoprene, butadiene, ethylenebutylene, and ethylene-propylene) (e.g., styrene-butadienestyrene block copolymers, styrene-isoprene-styrene block copolymers, styrene-ethylene-butylene-styrene block copolymers, styrene-ethylene-propylene-styrene block copolymers), polyurethane elastomers, polyolefin elastomers, hydroxyl functional versions of any of the aforesaid polymers, and combinations thereof.

Useful commercially available thermoplastic polymers include e.g., ethylene vinyl acetate copolymers available under the ELVAX series of trade designations from DuPont de Nemours (Wilmington, Del.) and the ULTRATHENE series of trade designations from Millennium Petrochemicals (Rolling Meadows, Ill.); ethylene methyl acrylate copolymers available under the OPTEMA series of trade designations from Exxon Chemical Co. (Houston, Tex.); ethylene n-butyl acrylate copolymers available under the LOTRYL series of trade designations from Elf Atochem North America (Philadelphia, Pa.), the ESCORENE series of trade designations from Exxon Chemical Co. and the ENATHENE series of trade designations from Millennium Petrochemicals; ethylene n-butyl acrylate carbon monoxide terpolymers available under the ELVALOY series of trade designations from DuPont; thermoplastic polyurethane polymers available under the PEARLSTICK series of trade designations from Aries Technologies (Derry, N.H. a distributor for Merquinsa, Barcelona, Spain); butylene/poly(alkylene ether) phthalate polymers available under the HYTREL series of trade designations from DuPont; ethylene acrylate copolymers also available under the ELVALOY series of trade designations from DuPont; and acrylic polymers available under the ELVACITE series of trade designations from ICI Acrylics (St. Louis, Mich.); isobutylene-isoprene copolymers available the BUTYL Rubber series of trade designations including BUTYL 268 and BUTYL 065 from Exxon Chemical Co. (Houston, Tex.); ethylene-propylene copolymers available under the VISTALON series of trade designations including, e.g., VISTALON 404, from Exxon Chemical Co.; styreneethylene/butylene-styrene block copolymers available under the KRATON G series of trade designations including, e.g., KRATON G-1652 and G-1657, from Shell Chemical Co. (Houston, Tex.); styrene-butadiene-styrene and styrene-isoprene-styrene block copolymers available under the KRATON D series of trade designations including, e.g., KRATON D-1111 and D-1112 from Shell Chemical Co.; silane terminated block copolymers available under the KRATON SKFG101 trade designation from Shell Chemical Co.; and styrene-butadiene-styrene and styrene-isoprene-styrene block copolymers available under the VECTOR series of trade designations including, e.g., VECTOR 4112, 4114 and 4411 from Dexco Polymers (Houston, Tex.).

The thermoplastic polymer is present in the composition in an amount of up to about 70% by weight, or from about 10% by weight to about 70% by weight, or from about 20% by weight to about 50% by weight of a thermoplastic polymer, based on the total weight of the composition.

Tackifying Resin

The adhesive composition may include a tackifying resin. Preferred tackifying resins have a ring and ball softening point of from about 70° C. to about 150° C., or from about 80° C. to about 120° C. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), and mixture thereof. Other useful tackifying agents are disclosed in, e.g., U.S. Pat. No. 6,355,317 incorporated herein by reference.

Suitable commercially available tackifying resins include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGALREZ 1094 trade designation from Hercules; and alphamethyl styrene resins available under the trade designations KRISTALEX 3070, 3085 and 3100, which have softening points of 70° C., 85° C. and 100° C., respectively, from Hercules.

The tackifying resin is present in an amount of up to about 70% by weight, or from about 1% by weight to about 70% by weight, or from about 20% by weight to about 50% by weight, based on the total weight of the composition.

The adhesive composition may also include other additives including, e.g., fillers, ultraviolet light stabilizers, antioxidants, catalysts, rheology modifiers, adhesion promoters e.g., silanes and alkyl silanes, biocides, corrosion inhibitors, dehydrators, organic solvents, colorants (e.g., pigments and dyes), surfactants, flame retardants, waxes, and mixtures thereof. Suitable fillers include, e.g., fumed silica, precipitated silica, talc, calcium carbonates, carbon black, aluminasilicates, clay, zeolites, ceramics, mica, titanium dioxide, and combinations thereof.

The adhesive composition is particularly useful for bonding wood to various substrates including wood, metal, plastic substrates (e.g., PVC, ABC and polycarbonate), metallic substrates, composites (e.g., polymer and wood fiber composites), and combinations thereof.

The invention will now be described by way of the following examples. All parts, ratios, percents, and amounts stated in the examples are by weight unless otherwise specified.

EXAMPLES

Test Procedures

Test procedures used in the examples include the following.

Peel Adhesion

A test sample is prepared as follows: a moisture curable hot melt adhesive composition is melted at 120-130° C., and transferred to the rolls of a Union Tool roll coater. The rolls are heated to 270-280° F. (132-138° C.); the temperature of the adhesive on the rolls is 265-270° F. The adhesive composition is coated on a piece of 0.5-inch-thick wood particleboard at 10-12 gram per square foot. Thereafter, the adhesive coating is quickly mated with a clean ABS substrate and pressed on a heated press at 160-180° F. (71-82° C.) for 20 seconds. The bond is cured in a controlled environment room at 75° F. and 50% relative humidity (RH) for 7-10 days.

Prior to testing, samples are conditioned at 50% RH and a testing temperature for 2-4 hours. Then, a sample is secured in a vise and pulled by human hands in peel direction within seconds upon removal from each conditioned environment.

The adhesion on wood particle board is observed and reported as percent wood failure (% WF), percent cohesive failure (% CF) and percent adhesive failure (% AF). The higher the percent wood failure is, the stronger the adhesion is.

Examples

Preparation of Polyol 1

290 grams (g) Empol TM 1018 (a dimerized acid from Cognis, Cincinnati, Ohio) and 71 g neopentyl glycol are charged in a flask equipped with a mechanical stirrer and a Dean-Stark trap for collecting water from the condensation reaction. The reaction is carried out at 100-140° C. under 28-inch Hg vacuum for 4-6 hours until the acid number is below 0.80. The polyol produced has a hydroxyl number of 55 and is designated as Polyol 1.

Preparation of Polyol 2

290 g Empol TM 1061 (a dimerized acid from Cognis) and 71 g neopentyl glycol are charged in a flask equipped with a mechanical stirrer and a Dean-Stark trap for the collection water fro the condensation reaction. The reaction was carried out at 100-140° C. under 28-inch Hg vacuum for 4-6 hours until the acid number was below 0.80. The polyol produced has a hydroxyl number of 55 and is designated as Polyol 2.

Comparative Example 1

A moisture curable hot melt polyurethane adhesive composition is prepared according to Example 19 of U.S. Pat. No. 6,387,442. Peel adhesion of the composition is tested according to the Peel Adhesive test method and the results are listed in Table I.

Comparative Example 2

A moisture curable hot melt polyurethane adhesive composition is prepared by mixing 155.4 g Polyol 2 with 198 g Elvax 150, 168 g Escorez 5615 and 30 g Sasolwax C80 (from Sasol Wax Americas, Shelton, Conn.) at 220-260° F. (104-126° C.) until smooth for 30-60 minutes. Then 48.6 g Rubinate 1225 (MDI from Huntsman Chemical, Houston, Tex.) is added and reacted for 1-1.5 hours at 220-275° F. (104-135° C.). Thereafter, 1-2 drops of Jeffcat DMDEE is added and mixed for 10-15 minutes. The viscosity of the composition is 37,000 cps at 250° F. (121° C.). Peel adhesion of the composition is tested according to the Peel Adhesive test method and the results are listed in Table I.

Comparative Example 3

A moisture curable hot melt polyurethane adhesive composition is prepared by mixing 155.4 g Polyol 2 with 198 g Elvax 150, and 198 g Escorez 5615 at 220-260° F. (104-126° C.) until smooth for 30-60 minutes. Then 48.6 g Rubinate 1225 (MDI from Huntsman Chemical) is added and reacted for 1-1.5 hours at 220-275° F. (104-135° C.). Thereafter, 1-2 drops of Jeffcat DMDEE is added and mixed for 10-15 minutes. The viscosity of the composition is 56,500 cps at 250° F. (121° C.). Peel adhesion of the composition is tested according to the Peel Adhesive test method and the results are listed in Table I.

Example 1

A moisture curable hot melt polyurethane adhesive composition is prepared by mixing 148.2 g Polyol 2 with 7.2 g Unlink 550 (a monofunctional alcohol from Baker Petrolite, Sugar Land, Tex.), 198 g Elvax 150 and 198 g Escorez 5615 at 220-260° F. (104-126° C.) until smooth for 30-60 minutes. Then 49.6 g Rubinate 1225 (MDI from Huntsman Chemical) is added and reacted for 1-1.5 hours at 220-275° F. (104-135° C.). Thereafter, 1-2 drops of Jeffcat DMDEE is added and mixed for 10-15 minutes. The viscosity of the composition is 56,400 cps at 250° F. (121° C.). Peel adhesion of the composition is tested according to the Peel Adhesive test method and the results are listed in Table I.

TABLE I

|  | 24° C. | 80° C. | −23° C. |
|---|---|---|---|
| Comp. Ex. 1 | 100% WF | 80% WF/20% CF | 100% AF |
| Comp. Ex. 2 | 90% WF/10% AF | 50% CF/50% AF | 100% AF |
| Comp. Ex. 3 | 100% WF | 80% CF/20% AF | 100% WF |
| Ex. 1 | 100% WF | 80% WF/20% CF | 100% WF |

While numerous embodiments and examples have been disclosed herein, it should be apparent that modifications can be made without departing from the spirit and scope of the invention. Therefore, the appended claims are intended to cover all such modifications that are within the scope of this invention. The relevant portions of all documents disclosed herein are hereby incorporated by reference in their entirety.

Other embodiments are within the claims.

What is claimed are:

1. A moisture curable hot melt adhesive composition comprising:
    a polyurethane prepolymer that comprises a reaction product of
        an amorphous polyester polyol that is a reaction product of a monomeric polyol and a dimerized fatty acid,
        a polyisocyanate, and
        a crystalline monofunctional alcohol having a melting point of no less than about 80° C.;
    a thermoplastic polymer that is an ethylene vinyl acetate copolymer; and
    optionally a tackifying resin,
wherein the polyester polyol is tailored to the polarity of the thermoplastic polymer such that the sum of the average equivalent weight of the monomeric polyol and the dimerized fatty acid is from about 300 to about 1500.

2. The adhesive composition of claim 1, wherein said monofunctional alcohol has carbon atoms of no less than 35.

3. The adhesive composition of claim 1, comprising
    from about 10% by weight to about 80% by weight said polyurethane prepolymer,
    from about 1% by weight to about 70% by weight said tackifying resin, and
    from about 10% by weight to about 70% by weight said thermoplastic polymer.

4. The adhesive composition of claim 1, wherein said polyurethane prepolymer exhibits a glass transition temperature of no greater than about 10° C.

5. The adhesive composition of claim 1, wherein said composition exhibits a melt viscosity of no greater than about 150,000 cps at 250° F. (121° C.).

6. The adhesive composition of claim 1, wherein the adhesive composition exhibits a peel adhesion of no less than 80% wood failure at 80° C.

7. The adhesive composition of claim 1, wherein said dimerized fatty acid comprises a reaction product of two unsaturated carboxyl acids, each having carbon atoms of no less than 12.

8. A moisture curable hot melt adhesive composition comprising
    a polyurethane prepolymer that comprises a reaction product of
        an amorphous polyester polyol that is a reaction product of a monomeric polyol and a dimerized fatty acid,
        a polyisocyanate, and
        a crystalline monofunctional alcohol having a inching point of no less than about 80° C.;
    optionally a tackifying resin; and
    optionally a thermoplastic polymer,
wherein said composition is free of a crystalline or a semi crystalline polyester polyol, and exhibits a peel adhesion of no less than 80% wood failure at 80° C.

9. The adhesive composition of claim 8, comprising
    from about 10% by weight to about 80% by weight said polyurethane prepolymer,
    from about 1% by weight to about 70% by weight said tackifying resin, and
    from about 10% by weight to about 70% by weight said thermoplastic polymer.

10. The adhesive composition of claim 8, wherein said composition exhibits a melt viscosity of from about 5,000 cps to about 150,000 cps at 250° F. (121° C.).

11. The adhesive composition of claim 8, wherein said prepolymer has a weight average molecular weight of at least about 20,000 g/mol.

12. The adhesive composition of claim 8, wherein said thermoplastic polymer is selected from the group consisting of polyolefins, polyalphaolefins, polyesters, ethylene vinyl acetate, polyacrylates, polymethacrylates, polyacrylamides, polyacrylonitriles, polyimides, polyamides, polyvinyl chloride, polysiloxanes, polyurethanes, polystyrene, polyetheramide copolymers, styrene-butadiene copolymers, styrene-butadiene-styrene copolymers, styrene-isoprene-styrene copolymers, styrene-ethylene-butylene-styrene copolymers, styrene-ethylene-propylene-styrene copolymers, butyl rubber, polyisobutylene, isobutylene-isoprene copolymers, hydroxyl functional versions of any of the aforesaid polymers, and combinations thereof.

13. The adhesive composition of claim 8, wherein said amorphous polyester polyol comprises a reaction product of a polyol and a dimerized acid.

14. An article comprising a first substrate, a second substrate and the adhesive composition of claim 1 sandwiched between said first and second substrates.

15. The article of claim 14, wherein at least one of said first and second substrates is selected from the group consisting of acrylonitrile-butadiene-styrene (ABS), fiber reinforced plastic (FRP), wood, wood composite panels, polyvinyl chloride (PVC), paper, impact modified polystyrene, polycarbonate, foamed polystyrene, metals, painted metals, galvanized metals, and combinations thereof.

16. An article comprising a first substrate, a second substrate and the adhesive composition of claim 8 sandwiched between said first and second substrates.

17. The article of claim 16, wherein at least one of said first and second substrates is selected from the group consisting of acrylonitrile-butadiene-styrene (ABS), fiber reinforced plastic (FRP), wood, wood composite panels, polyvinyl chloride (PVC), paper, impact modified polystyrene, polycarbonate, foamed polystyrene, metals, painted metals, galvanized metals, and combinations thereof.

18. A process of bonding a first substrate to a second substrate, comprising:
    applying the moisture curable hot melt adhesive composition of claim 1 on at least one surface of a first substrate, contacting said adhesive composition with a second substrate, and curing said adhesive composition.

19. A process of bonding a first substrate to a second substrate, comprising:

applying the moisture curable hot melt adhesive composition of claim 8 on at least one surface of a first substrate, contacting said adhesive composition with a second substrate, and curing said adhesive composition.

\* \* \* \* \*